United States Patent Office 3,361,787
Patented Jan. 2, 1968

3,361,787
FLUOROALKYL KETAL ESTERS
Robert A. Braun, Newark, Del., assignor to E. I. du Pont de Nemours and Company, Wilmington, Del., a corporation of Delaware
No Drawing. Filed Mar. 12, 1965, Ser. No. 439,465
9 Claims. (Cl. 260—468)

This invention relates to fluoroalkyl ketal esters. It is more particularly directed to compounds of the formula (1)
$$RO-\underset{\underset{Y}{|}}{\overset{\overset{O}{\|}}{C}}-\underset{\underset{Y}{|}}{\overset{\overset{X}{|}}{C}}-O-\underset{\underset{Y}{|}}{\overset{\overset{X}{|}}{C}}-OR$$

where R can be an alkyl radical of 1 through 18 carbon atoms, an alkyl radical of 1 through 18 carbon atoms substituted with chlorine or fluorine, an alkenyl radical of 2 through 6 carbon atoms, a cycloalkyl radical of 3 through 7 carbon atoms, phenyl, or phenyl substituted with chlorine, bromine, fluorine, methoxy, alkyl of 1 through 5 carbon atoms, or nitro;
X can be a perfluoroalkyl radical or a monochloroperfluoroalkyl radical, both of 1 through 5 carbon atoms; and
Y can be a perfluoroalkyl radical of 1 through 5 carbon atoms.

The compounds of the invention are thermally stable liquids which are water insoluble, non-flammable and hydrolysis resistant. The compounds are also liquid over a wide temperature range. These properties make the compounds useful as hydraulic fluids, heat transfer agents and as buoyancy and damping fluids in measuring and recording instruments.

The compounds of the invention can be prepared by the thermal rearrangement of perhaloalkyl substituted cyclic acetals according to the equation (2) 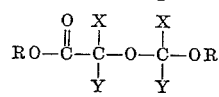

* The cyclic acetal starting material can be prepared by the reaction of a perhaloketone with an alkyl orthoformate. This reaction is described in more detail in copending application Ser. No. 325,468, filed Nov. 21, 1963.

In this equation R, X and Y are defined as in Formula 1.

The liquid cyclic acetal starting material is placed in a bomb or open container and heated to a temperature of from 160° C. to 300° C. Completion of the thermal rearrangement is best determined by periodic sampling and infra-red analysis. When the carbonyl (C=O) band values show no further increase, the reaction is substantially complete. This, in the usual case, takes from 6 to 75 hours. The product can be separated from unreacted starting material by gas chromatography or fractional distillation.

The compound produced in this fashion will be substantially pure, but if further purification is necessary or desirable, this can also be accomplished through gas chromatography or fractional distillation.

The following examples are presented so that the invention will be more easily understood and readily practiced. These examples are intended to be illustrative, and show only representative embodiments of the invention. Those compounds not specifically disclosed can be made by similar methods, varying significantly only in the reactants. In the examples, all parts are by weight.

*Example 1*

Twenty parts of

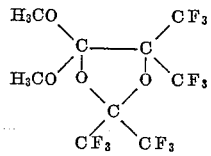

were heated in a bomb at 155–165° C. for 75 hours to give 12.3 parts of a liquid, which upon separation by preparative gas chromatography, gave 1.2 parts of

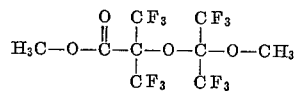

This compound had a boiling point of 156° C. at 760 mm., and a refractive index of $n_D^{25}$ 1.3678.

In a similar fashion, the reactants listed below can be heated in a bomb at 250° C. for about 8 hours to give the corresponding listed products:

|  | Reactant | Product |
|---|---|---|
| Example 2 | $F_3CH_2CO$ ... $CF_3$ (cyclic acetal structure) | $F_3C-H_2CO-\overset{O}{\underset{CF_3}{\overset{\|}{C}}}-\overset{CF_3}{\underset{CF_3}{\overset{\|}{C}}}-O-\overset{CF_3}{\underset{CF_3}{\overset{\|}{C}}}-OCH_2CF_3$ |
| Example 3 | (phenyl-S)—O ... $CF_3$ (cyclic acetal structure with two S-phenyl groups) | (S-phenyl)-O-$\overset{O}{\overset{\|}{C}}$-$\overset{CF_3}{\underset{CF_3}{\overset{\|}{C}}}$-O-$\overset{CF_3}{\underset{CF_3}{\overset{\|}{C}}}$-O-(S-phenyl) |
| Example 4 | (phenyl)—O ... $CF_3$ (cyclic acetal structure with two phenyl groups) | (phenyl)-O-$\overset{O}{\overset{\|}{C}}$-$\overset{CF_3}{\underset{CF_3}{\overset{\|}{C}}}$-O-$\overset{CF_3}{\underset{CF_3}{\overset{\|}{C}}}$-O-(phenyl) |

| | Reactant | Product |
|---|---|---|
| Example 5 | 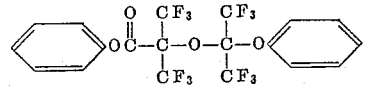 | 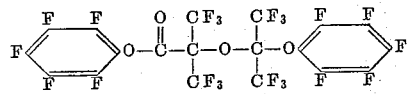 |
| Example 6 | 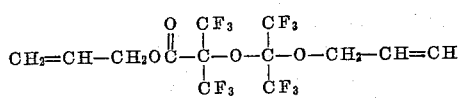 | 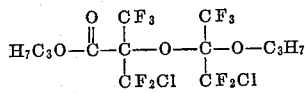 |

And the following reactant can be heated in a bomb at 190° C. for 50 hours to give the corresponding product.

| | Reactant | Product |
|---|---|---|
| Example 7 | | |

The claims are:

1. A compound of the formula $$RO-\overset{O}{\underset{}{C}}-\overset{X}{\underset{Y}{C}}-O-\overset{X}{\underset{Y}{C}}-O-R$$

where
R is selected from the group consisting of alkyl radicals of 1 through 18 carbon atoms, alkyl radicals of 1 through 18 carbon atoms substituted with a member of the group consisting of chlorine and fluorine, alkenyl radicals of 2 through 6 carbon atoms, cycloalkyl radicals of 3 through 7 carbon atoms, phenyl, phenyl substituted with a member of the group consisting of chlorine, bromine, fluorine, methoxy, alkyl of 1 through 5 carbon atoms and nitro;
X is selected from the group consisting of perfluoroalkyl radicals and monochloroperfluoroalkyl radicals, both of 1 through 5 carbon atoms, and
Y is a perfluoroalkyl radical of 1 through 5 carbon atoms.

2. A compound of the formula $$H_3C-O-\overset{O}{\underset{}{C}}-\overset{CF_3}{\underset{CF_3}{C}}-O-\overset{CF_3}{\underset{CF_3}{C}}-O-CH_3$$

3. A compound of the formula $$F_3C-H_2CO-\overset{O}{\underset{}{C}}-\overset{CF_3}{\underset{CF_3}{C}}-O-\overset{CF_3}{\underset{CF_3}{C}}-OCH_2CF_3$$

4. A compound of the formula

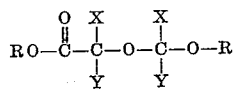

5. A compound of the formula

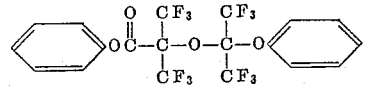

6. A compound of the formula

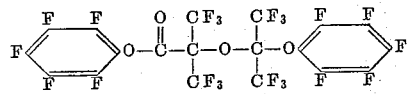

7. A compound of the formula $$CH_2=CH-CH_2O\overset{O}{\underset{}{C}}-\overset{CF_3}{\underset{CF_3}{C}}-O-\overset{CF_3}{\underset{CF_3}{C}}-O-CH_2-CH=CH$$

8. A compound of the formula $$H_7C_3O-\overset{O}{\underset{}{C}}-\overset{CF_3}{\underset{CF_2Cl}{C}}-O-\overset{CF_3}{\underset{CF_2Cl}{C}}-O-C_3H_7$$

9. A process for the preparation of the compound of claim 1, said process comprising heating, at autogenous pressure to a temperature of from 160° C. to 300° C., a compound of the formula

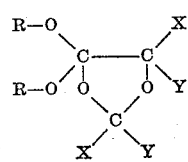

where
R is selected from the group consisting of alkyl radicals of 1 through 18 carbon atoms, alkyl radicals of 1 through 18 carbon atoms substituted with a member of the group consisting of chlorine and fluorine, alkenyl radicals of 2 through 6 carbon atoms, cycloalkyl radicals of 3 through 7 carbon atoms, phenyl and phenyl substituted with a member of the group consisting of chlorine, bromine, fluorine, methoxy, alkyl of 1 through 5 carbon atoms and nitro;

X is selected from the group consisting of perfluoroalkyl radicals and monochloroperfluoroalkyl radicals, both of 1 through 5 carbon atoms, and Y is a perfluoroalkyl radical of 1 through 5 carbon atoms.

References Cited
UNITED STATES PATENTS 3,125,599   3/1964   Warnell _____ 260—535

LORRAINE A. WEINBERGER, *Primary Examiner.*

S. WILLIAMS, *Assistant Examiner.*